US012767747B2

(12) United States Patent
Yun et al.

(10) Patent No.: US 12,767,747 B2
(45) Date of Patent: Oct. 20, 2026

(54) ANTIBACTERIAL POLYMER, AND ANTIBACTERIAL POLYMER FILM COMPRISING THE SAME

(71) Applicant: LG Chem, Ltd., Seoul (KR)

(72) Inventors: Haesung Yun, Daejeon (KR); Yeongbong Mok, Daejeon (KR); Hyeran Moon, Daejeon (KR); Hyunsuk Kim, Daejeon (KR); Hyungsam Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 569 days.

(21) Appl. No.: 18/032,866

(22) PCT Filed: Aug. 16, 2022

(86) PCT No.: PCT/KR2022/012197
§ 371 (c)(1),
(2) Date: Apr. 20, 2023

(87) PCT Pub. No.: WO2023/033410
PCT Pub. Date: Mar. 9, 2023

(65) Prior Publication Data

US 2024/0002567 A1 Jan. 4, 2024

(30) Foreign Application Priority Data

Aug. 30, 2021 (KR) ........................ 10-2021-0114960
Aug. 4, 2022 (KR) ........................ 10-2022-0097511

(51) Int. Cl.
*C08F 220/34* (2006.01)
*C08J 5/18* (2006.01)
*C08L 33/14* (2006.01)

(52) U.S. Cl.
CPC ............... *C08F 220/34* (2013.01); *C08J 5/18* (2013.01); *C08L 33/14* (2013.01); *C08J 2333/14* (2013.01); *C08L 2203/16* (2013.01); *C08L 2312/00* (2013.01)

(58) Field of Classification Search
CPC .. C08F 255/10; C08F 220/34; C08F 222/102; C08L 2312/00; C09D 151/04; C08J 2323/22; C08J 2333/14
USPC .......................................... 525/293; 522/149
See application file for complete search history.

(56) References Cited

U.S. PATENT DOCUMENTS 9,062,189 B2 * 6/2015 Rodgers .................. C08L 21/00
2001/0007694 A1 7/2001 Ottersbach et al.
2006/0034905 A1 2/2006 Singh et al.
2009/0286948 A1 * 11/2009 Chen ................... B01J 19/1806 526/339
2012/0328683 A1 12/2012 Song et al.
2012/0330209 A1 12/2012 Song et al.
2014/0170238 A1 6/2014 Cliff et al.
2017/0007464 A1 1/2017 Liu et al.
2017/0210839 A1 7/2017 Lorenz et al.
2017/0349777 A1 12/2017 Hiroi et al.
2018/0072928 A1 3/2018 Chatterjee et al.
2018/0360033 A1 12/2018 Naruse et al.
2019/0270916 A1 9/2019 Cho et al.
2021/0002493 A1 1/2021 Lawin et al.
2022/0041868 A1 2/2022 Kim et al.
2022/0316064 A1 10/2022 Dabbous et al.

FOREIGN PATENT DOCUMENTS

CA 2383030 A1 3/2001
CN 105330920 A 2/2016
CN 105916951 A 8/2016
CN 107636067 A 1/2018
CN 112368341 A 2/2021
JP H09157449 A 6/1997
JP H10-251340 A 9/1998
JP 2005307180 A 11/2005
JP 2007302651 A 11/2007
JP 2014520199 A 8/2014
JP 2016-530364 A 9/2016
JP 2017057240 A 3/2017
JP 2017528560 A 9/2017
JP 2019-048781 A 3/2019
KR 20070048229 A 5/2007
KR 20140024924 A 3/2014

(Continued)

OTHER PUBLICATIONS

EESR for Application No. 22864914.1 dated Mar. 5, 2024. 6 pgs.

(Continued)

*Primary Examiner* — Fred M Teskin
(74) *Attorney, Agent, or Firm* — Lerner David LLP

(57) ABSTRACT

Provided are a crosslinked polymer including an antibacterial polymerizable monomer represented by the following Chemical Formula 1, and an antibacterial polymer film including the same, which is able to exhibit an improved bacterial growth inhibition property while maintaining adhesive film performances:

[Chemical Formula 1]

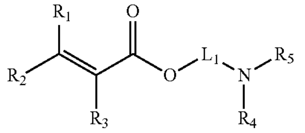

wherein $R_1$ to $R_5$ and $L_1$ are described herein.

18 Claims, No Drawings

(56) References Cited

FOREIGN PATENT DOCUMENTS

| | | | |
|---|---|---|---|
| WO | 0114435 | A1 | 3/2001 |
| WO | 2004-035666 | A2 | 4/2004 |
| WO | 2016093293 | A1 | 6/2016 |
| WO | 2019110205 | A1 | 6/2019 |
| WO | 2020254497 | A1 | 12/2020 |

OTHER PUBLICATIONS

International Search Report for PCT/KR2022/012197 mailed Nov. 28, 2022. 3 pgs.

Karamdoust, S., et al., "Preparation of antibacterial surfaces by hyperthermal hydrogen induced cross-linking of polymer thin films," Journal of Materials Chemistry, , Royal Society of Chemistry, Jan. 2012, pp. 4881-4888, vol. 22.

Search Report dated Jan. 21, 2026 from the Office Action for Chinese Application No. 202280006954.6 issued Jan. 22, 2026, 3 pages.

* cited by examiner

ANTIBACTERIAL POLYMER, AND ANTIBACTERIAL POLYMER FILM COMPRISING THE SAME

CROSS-REFERENCE TO RELATED APPLICATION

The present application is a national stage entry under 35 U.S.C. § 371 of International Application No. PCT/KR2022/012197 filed on Aug. 16, 2022, which claims priority from, Korean Patent Application Nos. 10-2021-0114960, and 10-2022-0097511, filed on Aug. 30, 2021, and Aug. 4, 2022, respectively, all the disclosures of which are hereby incorporated by reference herein.

TECHNICAL FIELD

The present invention relates to an antibacterial polymer and an antibacterial polymer film including the same.

BACKGROUND ART

Recently, with the diversification of life, improvement of living standards, and change and improvement of consciousness, interest in improving hygiene and comfort in an individual's living environment is increasing. Accordingly, studies have been conducted on microorganisms that threaten them, but many types of microorganisms exist in the daily living environment, and they are widespread in nature, causing serious problems.

In particular, microorganisms such as bacteria, fungi, etc. may inhabit various environments, such as dietary life, residential environments, clothing, industrial products, etc. However, since bacteria may cause various inflammations or food poisoning, and fungi may produce not only odors, but also various skin diseases, respiratory diseases, allergies, atopic dermatitis, etc., they are problematic. In addition, microorganisms living on the surface of electronic products and household products may cause deterioration of product performances.

In particular, under the recent influence of the pandemic, the number of cases where antibacterial films are applied on articles inevitably touched by the human body in multi-use facilities, etc. is increasing. Accordingly, in order to prevent human damage caused by microorganisms, various antibacterial substances have been developed to inhibit growth of microorganisms or to kill microorganisms.

With regard to the antibacterial films, inorganic antibacterial agents are mainly used, which are prepared by mixing inorganic particles (silver or copper, etc.) in the film to impart an antibacterial function. However, when the inorganic particles are mixed, there is an advantage that antibacterial properties may be maintained even under high temperature conditions, but there are problems in that they are expensive, there is a possibility of discoloration due to the metal ions contained after processing, and basic physical properties of the film are impaired by the increased viscosity and opacity of the film.

On the other hand, there are organic antibacterial agents as another antibacterial substance previously developed. Organic antibacterial agents have advantages in that they are inexpensive and have an excellent antibacterial effect even in a small amount, as compared to inorganic antibacterial agents, but there is a problem in that antibacterial durability is poor because there is a possibility of leaching after being applied to products. Moreover, organic antibacterial agents are able to secure stability of the products in terms of inhibiting microbial growth and killing microorganisms, but at the same time, it is toxic and causes irritation to the user's skin.

Accordingly, there is a demand for an antibacterial polymer composition which is used as an antibacterial adhesive film while maintaining antibacterial property and being safe without being leached from films, and maintaining basic physical properties of the adhesive film.

DISCLOSURE

Technical Problem

There are provided an antibacterial polymer including an antibacterial polymerizable monomer, and an antibacterial polymer film including the same, which is able to exhibit an improved bacterial growth inhibition property while maintaining adhesive film performances.

Technical Solution

There is provided an antibacterial polymer which is a crosslinked polymer of a polymerizable antibacterial monomer represented by the following Chemical Formula 1; a butyl-based rubber including a butene-derived repeating unit and an isoprene-derived repeating unit; and a crosslinking agent:

[Chemical Formula 1]

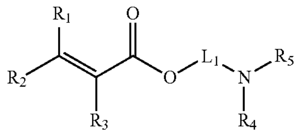

in Chemical Formula 1, $R_1$ to $R_3$ are each independently hydrogen or methyl, $R_4$ and $R_5$ are each independently hydrogen or a substituted or unsubstituted alkyl having 1 to 20 carbon atoms, and $L_1$ is a substituted or unsubstituted alkylene having 1 to 10 carbon atoms.

There is also provided an antibacterial polymer film including the crosslinked polymer.

Effect of the Invention

An antibacterial polymer of the present invention includes a polymerizable antibacterial monomer having an antibacterial property, and thus when manufactured as a film, it is possible to manufacture a safe and stable antibacterial polymer film.

Specifically, the antibacterial polymer may be manufactured into a film without changes in appearance, since the polymerizable antibacterial monomer is cured together when the monomer is crosslinked. Accordingly, it exhibits the antibacterial property against at least one of Gram-negative bacteria, while not generating a human safety problem which is caused by leaching of the antibacterial agent, because the used antibacterial monomer does not remain in the polymer.

BEST MODE FOR CARRYING OUT THE INVENTION

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

Further, in the present invention, when a layer or an element is mentioned to be formed "on" or "above" layers or elements, it means that each layer or element is directly formed on the layers or elements, or other layers or elements may be formed between the layers, subjects, or substrates.

The present invention may be variously modified and have various forms, and specific exemplary embodiments are exemplified and explained in detail in the following description. However, it is not intended to limit the present invention to the specific exemplary embodiments and it must be understood that the present invention includes every modifications, equivalents, or replacements included in the spirit and technical scope of the present invention.

Further, the technical terms used in this description are just for explaining specific exemplary embodiments and it is not intended to restrict the present invention. The singular expression used herein may include the plural expression unless it is differently expressed contextually.

In addition, in the present specification, an alkyl group may be straight or branched, and its number of carbon atoms is not particularly limited, but preferably 1 to 20. According to one embodiment, the number of carbon atoms of the alkyl group is 1 to 10. According to another embodiment, the number of carbon atoms of the alkyl group is 1 to 6. Specific examples of the alkyl group may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, etc., but are not limited thereto. Further, in the present specification, the above description of the alkyl group may also be applied to alkylene, except that the alkylene is a divalent group.

In order to bring antibacterial properties to household chemical products generally used in daily living space, such as homes, offices, multiuse facilities, etc., an antibacterial coating capable of inhibiting reproduction of microorganisms and/or killing microorganisms such as bacteria is made on the surface of these household chemical products. In particular, under the recent influence of the pandemic, the number of cases where antibacterial films are additionally attached to articles touched by many people in multi-use facilities, etc. is increasing. In this regard, antibacterial agents included in the antibacterial films damage cell membranes or cell walls of microorganisms or induce denaturation of proteins thereof, and as a result, growth of microorganisms is inhibited, leading to inhibition of reproduction of microorganisms and/or death of microorganisms.

There are more than 5,000 species of bacteria that have been identified. Specifically, bacteria have diverse cell morphologies such as spheres, rods, spirals, etc., and their demand for oxygen is also different from each other, and thus they are divided into aerobic bacteria, facultative bacteria, and anaerobic bacteria. Therefore, it is usually not easy for one type of antibacterial agent to have physical/chemical mechanisms whereby cell membranes/cell walls of various bacteria are damaged or proteins thereof are denatured.

In addition, there have been a problem that the antibacterial agent used for antibacterial coating is leached over time, or a user's health may be threatened by the antibacterial agent, when the user is continuously exposed to the antibacterial agent.

However, it was found that when an antibacterial polymer prepared by crosslinking-polymerization of a polymerizable antibacterial monomer having a specific structure is used as an antibacterial polymer film, the antibacterial polymer film may exhibit an antibacterial property against Gram-negative bacteria without leaching of the antibacterial monomer from the film, thereby completing the present invention. When the amino group of a polymerizable antibacterial monomer represented by Chemical Formula 1 binds with a proton to be positively charged, the interaction with the cell wall of microorganisms increases, and the alkyl group corresponding to the pendant group destabilizes the cell wall of the microorganisms and inhibits the growth of the microorganisms, thereby exhibiting the antibacterial property.

The antibacterial polymer film includes the antibacterial monomer in a crosslinked form in the film by curing the same together with a polymer (butyl-based rubber) which is a raw material of the film. Therefore, since there is no change in the appearance of the film, and the antibacterial monomer does not remain in the form of compound in the antibacterial polymer film, there is no concern about leaching of the antibacterial agent even over time, and thus excellent safety and stability may be exhibited.

Hereinafter, an antibacterial polymer and an antibacterial polymer film according to specific embodiments of the present invention will be described in more detail.

Antibacterial Polymer

An antibacterial polymer of one embodiment is a cross-linked polymer of a polymerizable antibacterial monomer represented by the following Chemical Formula 1; a butyl-based rubber including a butene-derived repeating unit and an isoprene-derived repeating unit; and a crosslinking agent:

[Chemical Formula 1]

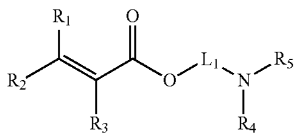

in Chemical Formula 1, $R_1$ to $R_3$ are each independently hydrogen or methyl, $R_4$ and $R_5$ are each independently hydrogen or a substituted or unsubstituted alkyl having 1 to 20 carbon atoms, and $L_1$ is a substituted or unsubstituted alkylene having 1 to 10 carbon atoms.

Since most bacterial cell membranes are negatively charged, most antibacterial substances have a positive charge. When a hydrogen cation (proton) binds to the amine of the compound represented by Chemical Formula 1 to exhibit a cationic property, it may interact with the cell membrane of bacteria, and thus the compound represented by Chemical Formula 1 has an antibacterial property.

The polymerizable antibacterial monomer represented by Chemical Formula 1 is crosslinked with the butyl-based rubber to be described later to form the crosslinked polymer. Since the crosslinked polymer is formed by photopolymerization of the polymerizable antibacterial monomer, the butyl-based rubber, and the crosslinking agent, polymerization of the polymerizable antibacterial monomer also occurs. In other words, the polymerizable antibacterial monomer does not exist as a separate compound in the antibacterial polymer film, but is crosslinked with the butyl-based rubber, and thus it does not leach over time. Therefore, when the polymerizable antibacterial monomer is manufactured as the polymer film, the antibacterial property of the film may be continuously maintained while being harmless to the human body.

In Chemical Formula 1, $R_1$ and $R_2$ may be each preferably hydrogen, and $R_3$ may be methyl.

Further, preferably, $R_4$ may be a substituted or unsubstituted alkyl having 1 to 10 carbon atoms, and more preferably, $R_4$ may be tert-butyl. In general, as the number of carbon atoms at the $R_4$ position is larger, affinity with the double layer of the outer cell wall of microorganisms is higher, thereby exhibiting strong antibacterial activity. In the case of alkyl having 8 or more carbon atoms, it is important to have an appropriate length because of exhibiting a strong bactericidal property even in water.

Preferably, $R_5$ may be hydrogen. When $R_5$ is an alkyl group, it may play a role in interacting with the outer cell wall of microorganisms as described above. However, when both $R_4$ and $R_5$ are alkyl groups, the electron inductive effect does not increase, but the alkyl groups negatively affect the interaction between the cell membrane and the positive charge due to the steric effect. In contrast, when $R_5$ is hydrogen, the steric effect becomes smaller and it more easily binds with protons to become positively charged, thereby exhibiting a stronger interaction with the negatively charged cell wall of microorganisms. Therefore, even when $R_4$ is tertbutyl having a relatively small number of carbon atoms, excellent antibacterial performance may be exhibited.

Preferably, $L_1$ is a substituted or unsubstituted alkylene having 1 to 5 carbon atoms, and more preferably, $L_1$ may be ethylene.

For example, the polymerizable antibacterial monomer may be a compound represented by the following Chemical Formula 1-1:

[Chemical Formula 1-1]

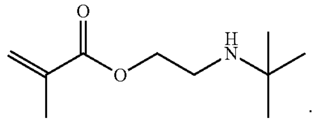

.

Meanwhile, the polymerizable antibacterial monomer is included in the antibacterial polymer in an amount of 5 parts by weight or more and 20 parts by weight or less with respect to 100 parts by weight of the butyl-based rubber. When the polymerizable antibacterial monomer is included in a small amount, performances of the adhesive film are equivalent to or higher than those of the traditional film, whereas it is difficult to exhibit a sufficient antibacterial effect due to the lack of antibacterial monomer. When the polymerizable antibacterial monomer is included in a large amount, its antibacterial performance may be very excellent, but the adhesive performance of the adhesive film is relatively reduced, and a yellowish problem in which the appearance turns yellow may occur. Therefore, when the polymerizable antibacterial monomer satisfies the above-mentioned range, it may have excellent effects in terms of both adhesive film performance and antibacterial performance.

More specifically, the polymerizable antibacterial monomer may be included in the antibacterial polymer in an amount of 5 parts by weight or more, 7 parts by weight or more, 9 parts by weight or more, 11 parts by weight or more, or 13 parts by weight or more, and 20 parts by weight or less, or 19 parts by weight or less with respect to 100 parts by weight of the butyl-based rubber.

Meanwhile, the antibacterial polymer includes the butyl-based rubber. The butyl-based rubber includes the butene-derived repeating unit and the isoprene-derived repeating unit. Upon polymerization of the above-described polymerizable antibacterial monomer and the butyl-based rubber, the isoprene-derived repeating unit and the polymerizable antibacterial monomer may be crosslinked.

Preferably, in the butyl-based rubber, the butene-derived repeating unit may be a repeating unit derived from isobutene.

Preferably, the butyl-based rubber may include the butene-derived repeating unit and the isoprene-derived repeating unit at a weight ratio of 90:10 to 99:1. When the weight ratio of the butene-derived repeating unit and the isoprene-derived repeating unit of the butyl-based rubber is within the above range, an adhesive composition having an excellent water barrier property may be obtained. This is assumed to be due to the stacking action by the double bond in the isoprene-derived backbone. More preferably, the weight ratio of the butene-derived repeating unit and the isobutylene-derived repeating unit may be 92:8 or more, 95:5 or more, 97:3 or more, or 98:2 or more, and 99:1 or less.

The butyl-based rubber may have a weight average molecular weight (Mw) of 50,000 g/mol or more and 2,000,000 g/mol or less. When the weight average molecular weight of the butyl-based rubber is less than 50,000 g/mol, the composition for manufacture of the film hardly has sufficient viscosity, and thus it is difficult to uniformly apply the composition upon coating of the substrate surface, and it is difficult to have sufficient physical properties as an encapsulating agent when the coating is completed. When the weight average molecular weight of the butyl-based rubber is more than 2,000,000 g/mol, it is difficult to prepare a uniform coating solution due to high viscosity when prepared as the coating solution, and it may be difficult to perform uniform coating even during the coating process, due to the high viscosity. More preferably, the weight average molecular weight of the antibacterial polymer may be 100,000 g/mol or more, 200,000 g/mol or more, 300,000 g/mol or more, 400,000 g/mol or more, or 500,000 g/mol or more, and 1,500,000 g/mol or less, 1,200,000 g/mol or less, 1,000,000 g/mol or less, 900,000 g/mol or less, 800,000 g/mol or less, 700,000 g/mol or less, or 600,000 g/mol or less.

In this regard, the weight average molecular weight (Mw) of the butyl-based rubber may be measured by gel permeation chromatography (GPC) using polystyrene (PS) as a standard sample for calibration. More specifically, 200 mg of the antibacterial polymer is diluted with 200 ml of N,N-dimethylformamide (DMF) solution to prepare about 1000 ppm of a sample, and then the weight average molecular weight may be measured using Agilent 1200 series GPC instrument at a flow rate of 1 ml/min through an RI detector.

At this time, the molecular weight of the sample may be calculated, based on a calibration curve obtained using 8 kinds of PS standards.

As the crosslinking agent, any compound may be used as long as it enables the introduction of crosslinking during polymerization of the antibacterial polymer composition. Preferably, the crosslinking agent may be any one selected from the group consisting of multifunctional (meth)acrylate monomers, multifunctional urethane (meth)acrylate oligomers, and mixtures thereof. As the crosslinking agent, a photocurable multifunctional (meth)acrylate monomer may be preferably used. The multifunctional (meth)acrylate may include bifunctional acrylates such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, dicyclopentanyl di(meth)acrylate, caprolactone modified dicyclopentenyl di(meth)acrylate, ethylene oxide modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethylene oxide-modified hexahydrophthalic acid di(meth)acrylate, tricyclodecanedimethanol di(meth)acrylate, neopentyl glycol-modified trimethylpropane di(meth)acrylate, adamantane di(meth)acrylate, or 9,9-bis[4-(2-acryloyloxyethoxy)phenyl]fluorene, etc.; trifunctional acrylates such as trimethylolpropane tri(meth)acrylate, dipentaerythritol tri(meth)acrylate, propionic acid-modified dipentaerythritol tri(meth) acrylate, pentaerythritol tri(meth)acrylate, propyleneoxide-modified trimethylolpropane tri(meth)acrylate, trifunctional urethane (meth)acrylate, or tris(meth)acryloxyethyl isocyanurate, etc.; tetrafunctional acrylates such as diglycerin tetra(meth)acrylate or pentaerythritol tetra(meth)acrylate, etc.; pentafunctional acrylates such as dipentaerythritol penta(meth)acrylate, etc.; and hexafunctional acrylates such as dipentalerythritol hexa(meth)acrylate, caprolactone-modified dipentaerythritol hexa(meth)acrylate, or urethane (meth)acrylate, a reaction product of an isocyanate monomer with trimethylolpropane tri(meth)acrylate, etc., but is not limited thereto. These compounds may be used alone or in a mixture of two or more thereof. More preferably, as the crosslinking agent, tricyclodecane dimethanol diacrylate (TCDDA) may be used.

Preferably, the crosslinking agent may be used in an amount of 5 parts by weight to 20 parts by weight with respect to 100 parts by weight of the butyl-based rubber. More preferably, the crosslinking agent may be used in an amount of 6 parts by weight or more, 7 parts by weight or more, 8 parts by weight or more, 9 parts by weight or more, or 10 parts by weight or more, and 18 parts by weight or less, 16 parts by weight or less, 14 parts by weight or less, 12 parts by weight or less, or 11 parts by weight or less with respect to 100 parts by weight of the butyl-based rubber.

Antibacterial Polymer Film

According to another embodiment of the present invention, provided is an antibacterial polymer film including the above-described antibacterial polymer.

The antibacterial polymer film including the antibacterial polymer is easily applicable to various fields and is suitable for mass production, and may also maintain the antibacterial effect for a long time because the polymerizable antibacterial monomer represented by Chemical Formula 1 having the antibacterial effect is polymerized into the polymer and is not leached.

Meanwhile, according to one exemplary embodiment of the present invention, the antibacterial polymer film may be manufactured by curing an antibacterial polymer composition including the polymerizable antibacterial monomer represented by Chemical Formula 1, the butyl-based rubber, and the crosslinking agent, and a solvent and other additives without particular limitation within the range that does not impair the effect of the present invention. The solvent is not limited, as long as it is a commonly used solvent, and the solvent may be added at the time of mixing respective components included in the antibacterial polymer composition, or may be included in the antibacterial polymer composition while adding respective components which are dispersed or mixed in the solvent. For example, the antibacterial polymer composition may include the solvent such that the total solid content of the components included in the antibacterial polymer composition is 1% by weight to 80% by weight, or 2% by weight to 50% by weight.

Non-limiting examples of the organic solvent may include ketones such as methyl ethyl ketone, methyl isobutyl ketone, acetylacetone or isobutyl ketone, etc.; alcohols such as methanol, ethanol, n-propanol, i-propanol, n-butanol, i-butanol, or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; toluene; or a mixture of two or more thereof.

For example, the additive may include a tackifier, a photoinitiator, a buffer, a wetting agent, a neutralizer, a polymerization terminator, etc., and may further include any one or more thereof.

The tackifier may be preferably a hydrogenated cyclic olefin-based polymer. For example, a hydrogenated petroleum resin obtained by hydrogenating a petroleum resin may be used. Hydrogenated petroleum resins may be partially or fully hydrogenated, and the tackifier may be a mixture of such resins. Such a tackifier may be selected from those having good compatibility with materials constituting the above-described antibacterial polymer composition and having excellent moisture barrier property and low organic volatile components. Specific examples of the hydrogenated petroleum resin may include hydrogenated terpene-based resins, hydrogenated ester-based resins, or hydrogenated dicyclopentadiene-based resins. The content of the tackifier may be appropriately adjusted as needed. Most preferably, hydrogenated dicyclopentadiene-based resins may be used as the tackifier.

The photoinitiator may be an alpha-hydroxy ketone-type compound, a benzyl ketal-type compound, or a mixture thereof, but is not limited thereto. Preferably, as the alpha-hydroxy ketone-type compound, 1-hydroxy-cyclohexyl-phenyl-ketone, 2-hydroxy 2-methyl-1-phenyl-1-propanone, 2-hydroxy-1-[4-(2-hydroxyethoxy)phenyl]-2-methyl-1-propanone, 2,2-dimethoxy-2-phenylacetophenone, 2,4,6-trimethylbenzoyl-diphenyl phosphine oxide, etc. may be used.

Additives such as buffers, wetting agents, neutralizing agents, polymerization terminators, etc. may also be used without limitation as long as they are commonly used in the art.

The antibacterial polymer film may exhibit the antibacterial property against Gram-negative bacteria. The Gram-negative bacteria collectively refer to bacteria that are stained red when stained by the Gram staining method, and have outer membrane consisting of lipopolysaccharides, lipoproteins, and other complex polymer materials instead of the cell wall having a relatively small amount of peptidoglycan, as compared to the Gram-positive bacteria. Thus, after staining with a basic dye such as crystal violet, even when the Gram-negative bacteria are treated with ethanol, they are decolorized, and when they are counter-stained with a red dye such as safranin, they appear red. Bacteria categorized as the Gram-negative bacteria may include *Proteus mirabilis, Escherichia coli, Salmonella typhi, Pseudomonas aeruginosa*, or *Vibrio cholerae*, etc.

Preferably, the antibacterial polymer film may exhibit the antibacterial property against *Escherichia coli* (*E. coli*).

Specifically, the antibacterial property of the antibacterial polymer film against *Escherichia coli* (*E. coli*) may be evaluated in accordance with an antibacterial activity test method JIS Z 2081, and a bacterial growth-inhibitory rate may be calculated using Equation 1 described below. The *E. coli* growth-inhibitory rate of the antibacterial polymer composition thus measured may be 70% or more, 72% or more, 80% or more, 84% or more, 90% or more, 92% or more, 95% or more, 96% or more, or 96.43% or more, and 100% or less, or 99.89% or less.

Specifically, the antibacterial property may be measured by the following method. 400 μl of a PBS buffer solution, in which the test bacterium *E. coli* is inoculated at a concentration of $2\times10^4$ CFU/ml, is applied to the antibacterial polymer film of 5 cm×5 cm in size. To prevent evaporation of moisture from the film surface, the antibacterial polymer film is covered with a dry PET film disinfected with alcohol, and incubated for 24 hours. The bacteria incubated for 24 hours are serially diluted, and spread on a solid agar medium. The number of bacteria may be determined by examining colonies that appeared. The measurement may be performed once or twice or more, and an average value of the results may be obtained.

Meanwhile, the bacterial growth-inhibitory rate may be determined by calculating according to the following Equation 1.

$$\text{Bacteria inhibitory rate (\%)} = \left(1 - S_{24hrs}/R_{24hrs}\right) * 100 \quad \text{[Equation 1]}$$

$S_{24hrs}$ represents the number of bacteria in the colonies, which are identified by culturing for 24 hours the antibacterial treatment sample to be examined for the bacteria inhibitory rate and then spreading on an agar medium, and $R_{24hrs}$ represents the number of bacteria in the colonies, which are identified by culturing for 24 hours Comparative Example without antibacterial treatment and then spreading on an agar medium.

The antibacterial polymer film of the present invention may have a glass adhesive strength and a viscosity equivalent to those of a traditional material without the polymerizable antibacterial monomer.

Preferably, the glass adhesive strength of the antibacterial polymer film may be 2300 gf/25 mm or more and 2500 gf/25 mm or less, more preferably, 2350 gf/25 mm or more, 2400 gf/25 mm or more, or 2420 gf/25 mm or more, and 2480 gf/25 mm or less, or 2450 gf/25 mm or less.

The glass adhesive strength of the antibacterial polymer film may be measured by the following method. After removing a release film of the antibacterial polymer film, the Cu side of the film to which a copper foil and PET are attached is laminated and attached with the adhesive film. The attached film is cut to a width of 25 mm and a length of 150 mm, and the prepared specimen is attached by laminating it to a glass plate of 90 mm*150 mm at a temperature of 50° C. The glass plate of the prepared specimen is fixed, and the film portion is peeled off to measure a low-speed peeling force in a T.A Tension mode of TA.XTplus Texture analyzer. The measurement of the low-speed peeling force is carried out under the conditions of a speed of 5 mm/sec, a trigger force of 5.0 g, and a distance of 80 mm.

Preferably, the viscosity of the antibacterial polymer film may be 70,000 Pa·S or more and 90,000 Pa·S or less, more preferably, 72,000 Pa·S or more, 75,000 Pa·S or more, 77,000 Pa·S or more, or 78,000 Pa·S or more, and 85,000 Pa·S or less, 83,000 Pa·S or less, 81,000 Pa·S or less, 80,000 Pa·S or less, or 79,000 Pa·S or less.

The viscosity of the antibacterial polymer film may be measured by the following method. First, the protective films (release films) are removed from the two samples of the same adhesive film, respectively, and then laminated and attached by matching well the size of both sides. A part of the periphery is removed, and divided into 2 parts to remove the release film from each side, followed by lamination again. This method is repeated so that the thickness of the adhesive film falls within the range of 500 μm to 800 μm. After measuring the exact thickness, the film is cut into a square size of 15 mm*15 mm, and measured using an ARES-G2 Rheometer. Measurement is carried out in a frequency sweep mode under conditions of a strain of 5% and a temperature of 27° C., and a complex viscosity is measured at 1 Hz.

The antibacterial polymer film may be cured by including a tackifier, etc., which may in itself function as an adhesive film, or the antibacterial polymer composition is applied on a substrate, and then the resulting product may be used after photocuring.

Specifically, according to one exemplary embodiment of the present invention, provided is an antibacterial article including one or more substrates; and a coating layer provided on at least one surface of the substrate, wherein the coating layer is formed by curing the antibacterial polymer composition including the above-described antibacterial polymer.

The substrate may be a polymer film such as polyethylene (PE), polypropylene (PP), polystyrene (PS), polyamide (PA), polyimide (PI), polyethylene terephthalate (PET), polyvinyl chloride (PVC), etc.; a fabric; a glass; a plastic foam such as urethane foam and styrofoam; a solid wood; a plywood; or a metal substrate, but is not limited thereto.

In addition, the antibacterial article is not limited to its type, such as various household chemical products, automobile parts, building materials, organic electronic devices, etc., which require antibacterial properties. For example, the antibacterial polymer film may be used as an encapsulation film, when used in an organic electronic device.

Specifically, the antibacterial article may be one or more selected from fresh-keeping materials, fabric products, agricultural films, organic electronic devices, various office supplies, and various packaging materials.

For example, packaging materials such as food packaging materials, vegetable packaging materials, grain packaging materials, fruit packaging materials, meat packaging materials, aquatic products packaging materials, processed food packaging materials, fresh-keeping materials such as containers for vegetables, grains, fruits, meat, aquatic products, processed foods, etc.; tray mats for foods; fabric products such as table mats, tablecloths, carpets, seat covers, etc.; agricultural films; organic electronic devices; masks; office supplies such as tapes, adhesive tapes, masking tapes, and masking films, etc.; various packaging materials such as flower packaging materials, plastic bags, easy-open packaging bags, shopping bags, standing bags, transparent packaging boxes, automatic packaging films, electronic parts packaging materials, mechanical parts packaging materials, etc.

Further, the coating layer may be provided at a thickness of, for example, 10 μm or more, 20 μm or more, 50 μm or more, 80 μm or more, 100 μm or more, or 150 μm or more, and 1 mm or less, 800 μm or less, 600 μm or less, 500 μm or less, 300 μm or less, 250 μm or less, or 200 μm or less. This coating layer may be formed by thin film coating, in which the antibacterial polymer composition is applied onto at least one surface of the substrate and then dried at a temperature of 40° C. to 80° C. for 60 minutes to 240 minutes.

Methods and devices commonly used for applying the antibacterial polymer composition may be used without any particular limitation. For example, a bar coating method such as Meyer bar, etc., a gravure coating method, a 2-roll reverse coating method, a vacuum slot die coating method, a 2-roll coating method, etc. may be used.

The thickness of the antibacterial polymer film may be determined according to the use of the film finally manufactured, and for example, the antibacterial polymer composition may be coated (applied) at a thickness of 1 μm to 1,000 μm, or manufactured as a single adhesive film.

In the step of photocuring the antibacterial polymer composition, ultraviolet ray or visible ray with a wavelength of 200 nm to 400 nm may be irradiated, and upon irradiation, the exposure dose is preferably 50 $mJ/cm^2$ to 2,000 $mJ/cm^2$. The exposure time is not particularly limited, but may be appropriately changed according to the exposure apparatus to be used, the wavelength or exposure amount of light to be irradiated.

In addition, in the step of photocuring the antibacterial polymer coating composition, nitrogen purging may be performed in order to apply a nitrogen atmosphere condition.

Hereafter, the present invention will be described in more detail for better understanding. However, the following exemplary embodiments are only for illustrating the present invention, and the content of the present invention is not limited by the following exemplary embodiments.

Example: Manufacture of Antibacterial Polymer Film

Comparative Example 1

99 g of a solution, in which a butyl rubber (weight average molecular weight of 500,000 g/mol, product name: BR268, ExxonMobil Chemical) comprising 98% by weight of isobutene-derived units and 2% by weight of isoprene-derived units was dissolved in toluene at a solid content of 16% by weight, 20 g of a dicyclopentadiene hydrogenated resin (SU500, Kolon, 70% by weight) dissolved in toluene, as a tackifier, 1.6 g of tricyclodecane dimethanol diacrylate (TCDDA) as a crosslinking agent, 0.3 g of Irgacure 651 (2,2-dimethoxy-2-phenylacetophenone) as a photoinitiator were dissolved in toluene and mixed such that the total solid content was 22% by weight, thereby obtaining a polymer composition.

The composition solution thus prepared was filtered with a 400 mesh nylon filter, and applied to the release surface of a release PET using a bar coater, dried at 120° C. in a dryer for 4 minutes, and an additional release PET was laminated on the release surface of the upper surface of the dried polymer film. A polymer film was manufactured such that the thickness of the polymer film layer after drying was 30 μm to 40 μm. The polymer film was cured by irradiating a total of 2 $J/cm^2$ of ultraviolet rays.

Reference Example 1

An antibacterial polymer film was manufactured in the same manner as in Comparative Example 1, except that the polymer composition included, in addition to the polymer composition of Comparative Example 1, 2-(tert-butylamino) ethyl methacrylate (Sigma-Aldrich) as a polymerizable antibacterial monomer in an amount of 3 parts by weight with respect to 100 parts by weight of butyl rubber.

Reference Example 2

An antibacterial polymer film was manufactured in the same manner as in Comparative Example 1, except that the polymer composition included, in addition to the polymer composition of Comparative Example 1, 2-(tert-butylamino) ethyl methacrylate (Sigma-Aldrich) as a polymerizable antibacterial monomer in an amount of 25 parts by weight with respect to 100 parts by weight of butyl rubber.

Example 1

An antibacterial polymer film was manufactured in the same manner as in Comparative Example 1, except that the polymer composition included, in addition to the polymer composition of Comparative Example 1, 2-(tert-butylamino) ethyl methacrylate (Sigma-Aldrich) as a polymerizable antibacterial monomer in an amount of 13 parts by weight with respect to 100 parts by weight of butyl rubber.

Example 2

An antibacterial polymer film was manufactured in the same manner as in Comparative Example 1, except that the polymer composition included, in addition to the polymer composition of Comparative Example 1, 2-(tert-butylamino) ethyl methacrylate (Sigma-Aldrich) as a polymerizable antibacterial monomer in an amount of 19 parts by weight with respect to 100 parts by weight of butyl rubber.

Example 3

An antibacterial polymer film was manufactured in the same manner as in Comparative Example 1, except that the polymer composition included, in addition to the polymer composition of Comparative Example 1, 2-(tert-butylamino) ethyl methacrylate (Sigma-Aldrich) as a polymerizable antibacterial monomer in an amount of 7 parts by weight with respect to 100 parts by weight of butyl rubber.

Experimental Example

(1) Evaluation of Antibacterial Property of Antibacterial Polymer Film Against *E. coli*

Evaluation of antibacterial property was performed on the antibacterial adhesive films manufactured in Examples and Comparative Example, respectively.

In detail, the number of bacteria was examined using an antibacterial activity test method JIS Z 2081 as an antibacterial test. 400 μl of a PBS buffer solution, in which the test bacterium *E. coli* was inoculated at a concentration of $2\times10^4$ CFU/ml, was applied to the antibacterial polymer film of 5 cm×5 cm in size. To prevent evaporation of moisture from the film surface, the antibacterial polymer film was covered with a dry PET film disinfected with alcohol, and incubated for 24 hours. The bacteria incubated for 24 hours were serially diluted, and spread on a solid agar medium, and the number of bacteria was determined by examining colonies that appeared. The results are shown in Table 1. The experiment was performed twice, and the number of bacteria was examined and averaged.

Meanwhile, the bacterial growth-inhibitory rate was calculated as follows, and the results are shown in Table 1.

$$\text{Bacteria inhibitory rate}(\%)=(1-S_{24hrs}/R_{24hrs})*100 \quad \text{[Equation 1]}$$

$S_{24hrs}$ represents the number of bacteria in the colonies, which were identified by culturing Example (antibacterial treatment sample) for 24 hours and then spreading the same on an agar medium, and $R_{24hrs}$ represents the number of bacteria in the colonies, which were identified by culturing Comparative Example for 24 hours and then spreading the same on an agar medium.

TABLE 1

| | Number of bacteria of Sample 1 (logCFU/ml) | Number of bacteria of Sample 2 (logCFU/ml) | Average of number of bacteria (logCFU/ml) | Bacteria inhibitory rate (%) |
|---|---|---|---|---|
| Comparative Example 1 | 5.48 | 5.90 | 5.74 | — |
| Reference Example 1 | 5.40 | 5.84 | 5.67 | 20.0 |
| Reference Example 2 | 2.14 | 2.08 | 2.11 | 99.9 |
| Example 1 | 4.26 | 4.31 | 4.29 | 96.4 |
| Example 2 | 2.52 | 2.96 | 2.79 | 99.9 |
| Example 3 | 4.52 | 4.87 | 4.73 | 90.2 |

Referring to Table 1, it was confirmed that when the antibacterial films were manufactured using the antibacterial polymer compositions of Examples, they exhibited the excellent bacterial growth-inhibitory rate of 95% or more against Gram-negative bacterium *E. coli*, unlike the antibacterial film of Comparative Example 1 without the antibacterial polymer. As in Reference Example 1, when the content of the antibacterial monomer was low, it was considered that since the antibacterial performance did not exceed the reference value, the antibacterial function was not expressed. It was confirmed that Reference Example 2 expressed high antibacterial performance due to the high content of the antibacterial monomer.

(2) Measurement of Glass Adhesive Strength of Antibacterial Polymer Film

After removing release films of the antibacterial polymer films manufactured in Examples and Comparative Examples, respectively, the Cu side of the film to which a copper foil and PET were attached was laminated and attached with the adhesive film. The attached film was cut to a width of 25 mm and a length of 150 mm, and the prepared specimen was attached by laminating it to a glass plate of 90 mm*150 mm at a temperature of 50° C. The glass plate of the prepared specimen was fixed, and the film portion was peeled off to measure a low-speed peeling force in a T.A Tension mode of TA.XTplus Texture analyzer. The measurement of the low-speed peeling force was carried out under the conditions of a speed of 5 mm/sec, a trigger force of 5.0 g, and a distance of 80 mm. The results are shown in Table 2 below.

(3) Measurement of Viscosity of Antibacterial Polymer Film

First, the protective films (release films) were removed from the two samples of the same adhesive film, respectively, and then laminated and attached by matching well the size of both sides. A part of the periphery was removed, and divided into 2 parts to remove the release film from each side, followed by lamination again. This method was repeated so that the thickness of the adhesive film fall within the range of 500 μm to 800 μm. After measuring the exact thickness, the film was cut into a square size of 15 mm*15 mm, and measured using an ARES-G2 Rheometer (TA instrument). Measurement was carried out in a frequency sweep mode under conditions of a strain of 5% and a temperature of 27° C., and a complex viscosity was measured at 1 Hz. The results are shown in Table 2 below.

TABLE 2

| | Glass adhesive strength (gf/25 mm) | Viscosity (Pa · S) |
|---|---|---|
| Comparative Example 1 | 2,500 | 81,000 |
| Reference Example 1 | 2,490 | 80,000 |
| Reference Example 2 | 2,120 | 75,200 |
| Example 1 | 2,450 | 79,000 |
| Example 2 | 2,420 | 78,000 |
| Example 3 | 2,450 | 80,000 |

As shown in Table 2, it was confirmed that there was no significant difference in the adhesive strength between the film manufactured by polymerizing the antibacterial monomer together and the film without the antibacterial monomer. It was also confirmed that there was no significant difference in the viscosity between Examples with the antibacterial function, as in the glass adhesive strength. Based on these results, it was confirmed that the polymerizable antibacterial material did not significantly affect the adhesive properties up to a certain content level. However, as in Reference Example 2, it was confirmed that when the content of the antibacterial monomer was high, both the adhesive strength and the viscosity decreased. This is considered that as the copolymerization ratio of the antibacterial monomer increases, it affects the existing adhesive strength.

The invention claimed is:

1. An antibacterial polymer which is a crosslinked polymer of a polymerizable antibacterial monomer represented by Chemical Formula 1; a butyl-based rubber including a butene-derived repeating unit and an isoprene-derived repeating unit; and a crosslinking agent:

[Chemical Formula 1]

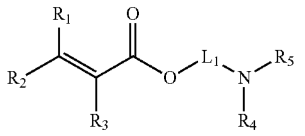

in Chemical Formula 1, $R_1$ to $R_3$ are each independently hydrogen or methyl, $R_4$ and $R_5$ are each independently hydrogen or a substituted or unsubstituted alkyl having 1 to 20 carbon atoms, and $L_1$ is a substituted or unsubstituted alkylene having 1 to 10 carbon atoms.

2. The antibacterial polymer of claim 1, wherein
$R_1$ and $R_2$ are each hydrogen, and
$R_3$ is methyl.

3. The antibacterial polymer of claim 1, wherein
$R_4$ is tert-butyl.

4. The antibacterial polymer of claim 1, wherein
$R_5$ is hydrogen.

5. The antibacterial polymer of claim 1, wherein
$L_1$ is ethylene.

6. The antibacterial polymer of claim 1, wherein the polymerizable antibacterial monomer represented by Chemical Formula 1 is represented by Chemical Formula 1-1:

[Chemical Formula 1-1]

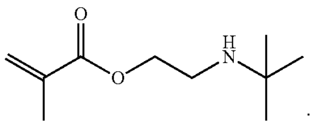

7. The antibacterial polymer of claim 1, wherein
the polymerizable antibacterial monomer is used in an amount of 5 parts by weight to 20 parts by weight with respect to 100 parts by weight of the butyl-based rubber.

8. The antibacterial polymer of claim 1, wherein
the butene-derived repeating unit is an isobutene-derived repeating unit.

9. The antibacterial polymer of claim 1, wherein
the butyl-based rubber includes the butene-derived repeating unit and the isoprene-derived repeating unit at a weight ratio of 90:10 or more and 99:1 or less.

10. The antibacterial polymer of claim 1, wherein
the butyl-based rubber has a weight average molecular weight of 50,000 g/mol or more and 2,000,000 g/mol or less.

11. The antibacterial polymer of claim 1, wherein
the crosslinking agent is any one selected from the group consisting of multifunctional (meth)acrylate monomers, multifunctional urethane (meth)acrylate oligomers, and mixtures thereof.

12. An antibacterial polymer film comprising the antibacterial polymer of claim 1.

13. The antibacterial polymer film of claim 12, further comprising a tackifier.

14. The antibacterial polymer film of claim 13, wherein
the tackifier is a hydrogenated dicyclopentadiene-based (DCPD-based) resin.

15. The antibacterial polymer film of claim 12, wherein
the antibacterial polymer film exhibits an antibacterial property against Gram-negative bacteria.

16. The antibacterial polymer film of claim 15, wherein
the Gram-negative bacteria is *Escherichia coli.*

17. An antibacterial polymer film which is manufactured by curing an antibacterial polymer composition including a polymerizable antibacterial monomer represented by Chemical Formula 1; a butyl-based rubber including a butene-derived repeating unit and an isoprene-derived repeating unit; and a crosslinking agent:

[Chemical Formula 1]

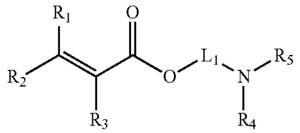

in Chemical Formula 1,
$R_1$ to $R_3$ are each independently hydrogen or methyl,
$R_4$ and $R_5$ are each independently hydrogen or a substituted or unsubstituted alkyl having 1 to 20 carbon atoms, and
$L_1$ is a substituted or unsubstituted alkylene having 1 to 10 carbon atoms.

18. An antibacterial article comprising:
one or more substrates; and
the antibacterial polymer film of claim 12, which is provided on one or more surfaces of the one or more substrates.

* * * * *